E. B. HOPKINS.
MOTOR VEHICLE SIGNAL.
APPLICATION FILED MAR. 17, 1914.
1,144,903.
Patented June 29, 1915.
2 SHEETS—SHEET 1.
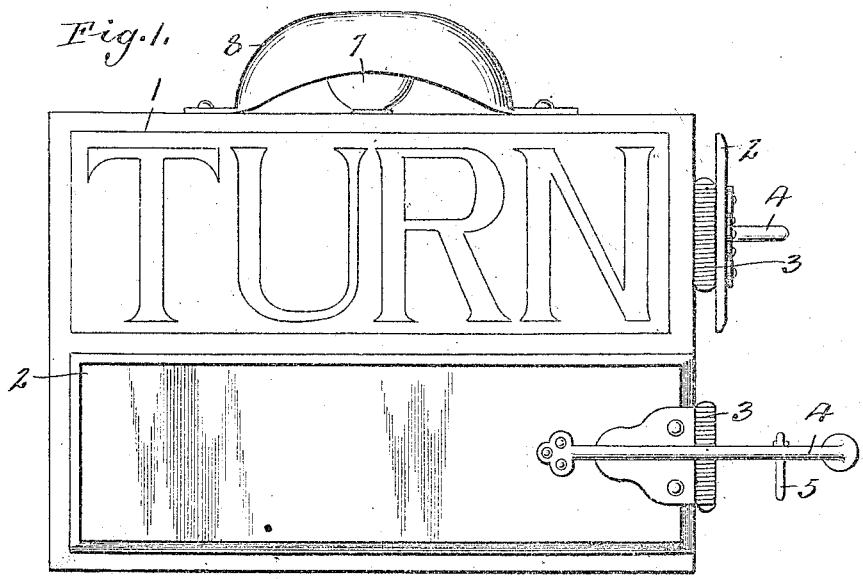
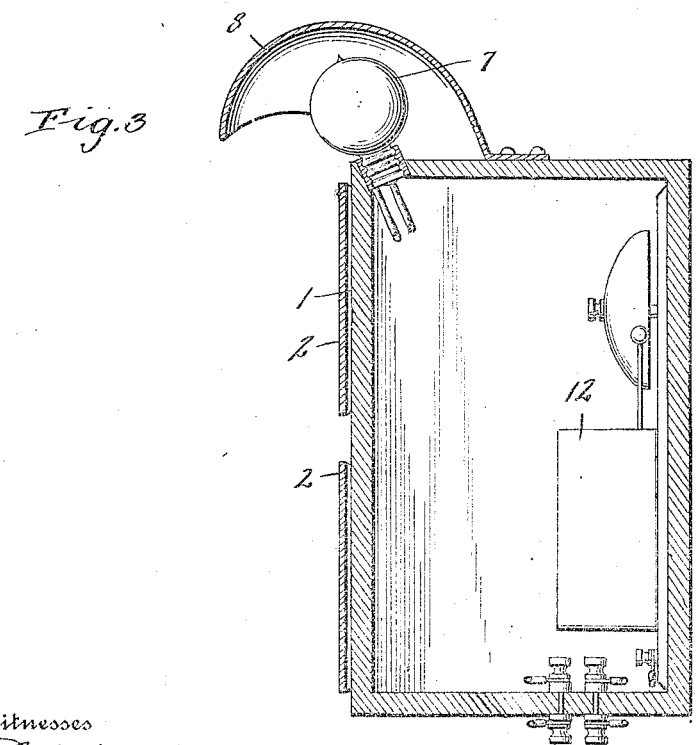
Witnesses
Inventor
E. B. Hopkins,
By Victor J. Evans
Attorney E. B. HOPKINS.
MOTOR VEHICLE SIGNAL.
APPLICATION FILED MAR. 17, 1914.
1,144,903.
Patented June 29, 1915.
2 SHEETS—SHEET 2.
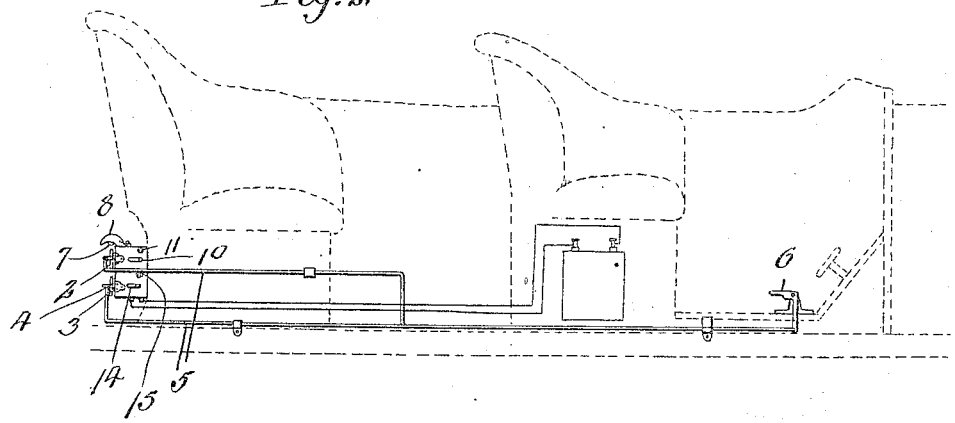
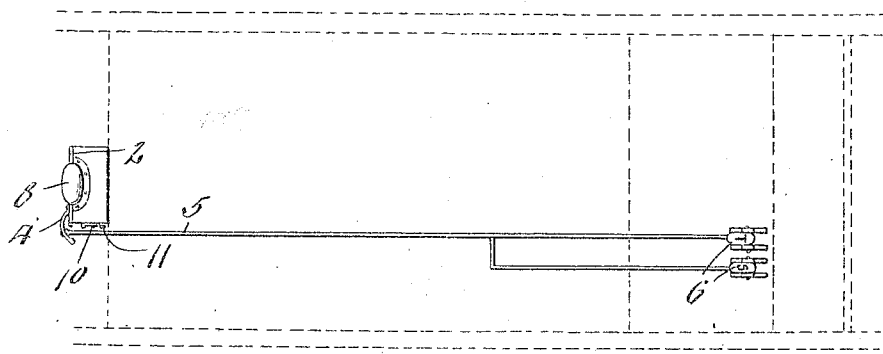
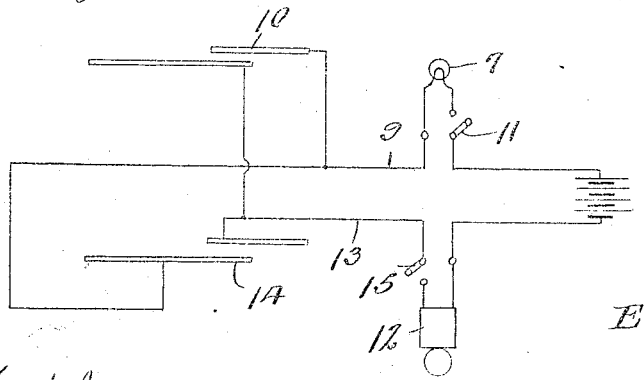
Witnesses
Inventor
E. B. Hopkins,
By Victor J. Evans
Attorney

UNITED STATES PATENT OFFICE.

EDWARD B. HOPKINS, OF SAVANNAH, GEORGIA.

MOTOR-VEHICLE SIGNAL.

1,144,903.

Specification of Letters Patent. Patented June 29, 1915.

Application filed March 17, 1914. Serial No. 825,337.

*To all whom it may concern:*

Be it known that I, EDWARD B. HOPKINS, a citizen of the United States, residing at Savannah, in the county of Chatham and State of Georgia, have invented new and useful Improvements in Motor-Vehicle Signals, of which the following is a specification.

The primary purpose of the invention is the provision of signaling means whereby the driver of a vehicle may give warning to the driver of a following vehicle when about to make a turn or stop with the result that a rear end collision is avoided.

The invention embodies both a visible and an audible signaling device, such signal devices operating in unison to give ample warning so that the driver of a vehicle in the rear may be advised in time of the intention of the driver of the vehicle ahead to prevent an accident.

A further purpose of the invention is the provision of a signaling means which may be operated by foot, thereby leaving the hands free for manipulating the several controls of a motor vehicle, said signaling means being of such a nature as to give proper warning both by day and by night.

The invention also further consists of the novel features, details of construction and combination of parts, which hereinafter will be more particularly set forth, illustrated and claimed.

In the drawings, hereto attached:—Figure 1 is a front view of a signaling mechanism embodying the invention. Fig. 2 is a top plan view. Fig. 3 is a vertical section. Fig. 4 is a horizontal section. Fig. 5 is a diagrammatic view showing the electric circuit which includes the lamp and bell and the switches whereby the current is controlled.

Corresponding and like parts are referred to in the following description, and indicated in all the views of the drawings, by the same reference characters.

The invention embodies a surface 1 which bears suitable words for giving proper warning, such words designating the intention of the driver either to stop or turn. Shutters 2 normally cover the matter appearing upon the surface 1, such shutters being connected to a suitable support by means of spring hinges which may be of any construction, an arm 4 extends outward from each of the shutters and a suitable connection 5 couples the arm 4 to a foot lever 6 which is conveniently positioned to be engaged by the foot of the operator. It is to be understood that a shutter 2 is provided for each direction or other matter appearing on the surface 1 to be displayed and each of such shutters is connected with a foot lever 6 and in order that the operator may select the proper lever the same is provided with indicated matter corresponding with that covered by the shutter so that when a selected lever 6 is operated the driver of the vehicle is advised of the nature of the direction exposed so as to give proper warning to the operator or driver of the vehicle following. A lamp 7 is arranged in such position as to illuminate the surface 1 and thereby enable the matter to be read by night. A hood 8 covers the lamp 7 and the side facing the surface 1 is polished to form a reflecting surface. The lamp 7 is of the electric type and is included in a circuit 9 containing a circuit closer 10 and a switch 11. The switch 11 not only enables the lamp circuit to be interrupted during the day but provides means for closing such circuit whereby the lamp may be lighted at night. The circuit closer 10 is arranged to be engaged by the shutter 2 when the same is thrown open. It is to be understood that the lamp 7 is only lighted at such times when the shutter is moved to expose the direction or other matter appearing on the surface 1.

The audible signal consists of an electric bell 12 which is included in a circuit 13, such circuit embodying a circuit closer 14 and a switch 15, the latter enabling the bell to be thrown into or out of action. The circuit closer 14 is adapted to be operated by means of the shutter when the same is thrown open.

The surface 1 with the matter appearing thereon, together with the adjunctive part such as the shutter 2 and lamp 7 constitute the visible signal whereas the bell 12 constitutes the audible signal. It is to be understood that one or the other signals may be cut out if so desired and during the day the lamp 7 is cut out by means of the switch 11. The circuit closers 10 and 15 are arranged to be engaged by the shutter when swung open, the bell directing attention to the warning should the operator of the following vehicle neglect to keep a sharp look ahead. It is to be understood that the signal is to be located in the rear of a vehicle in such position as to be readily observed by the operator or driver of a vehicle in the rear.

If desired my lamp 7 may be utilized at night in the capacity of a tail light to show a red light in the rear.

From the foregoing description, taken in connection with the accompanying drawings, the advantages of the construction and of the method of operation will be readily apparent to those skilled in the art to which the invention appertains and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention what is claimed as new, is:—

A vehicle signal embodying a casing, a shutter, a spring hinge connecting one end of the shutter to said casing, a curved arm connected at one end to the said shutter at a point in horizontal alinement with the center of said spring, said arm having its remaining end enlarged to form a contact, a contact plate secured to the side of the casing and disposed in the path of movement of said arm, a signal circuit connected to said arm and contact plate, and means connected to said arm for swinging said shutter.

In testimony whereof I affix my signature in presence of two witnesses.

EDWARD B. HOPKINS.

Witnesses:
E. M. HOPKINS,
A. R. HOPKINS.